United States Patent
Peng

(10) Patent No.: US 10,997,466 B2
(45) Date of Patent: May 4, 2021

(54) METHOD AND SYSTEM FOR IMAGE SEGMENTATION AND IDENTIFICATION

(71) Applicant: StraxCorp Pty. Ltd., Melbourne (AU)

(72) Inventor: Yu Peng, Melbourne (AU)

(73) Assignee: STRAXCIRO PTY. LTD., Melbourne (AU)

(*) Notice: Subject to any disclaimer, the term of this patent is extended or adjusted under 35 U.S.C. 154(b) by 44 days.

(21) Appl. No.: 16/448,252

(22) Filed: Jun. 21, 2019

(65) Prior Publication Data

US 2020/0401854 A1    Dec. 24, 2020

(51) Int. Cl.
  *G06K 9/00*  (2006.01)
  *G06K 9/62*  (2006.01)
  *G06T 7/11*  (2017.01)

(52) U.S. Cl.
  CPC ......... *G06K 9/6262* (2013.01); *G06K 9/6257* (2013.01); *G06K 9/6259* (2013.01);
  (Continued)

(58) Field of Classification Search
  CPC .. G06K 9/6262; G06K 9/6259; G06K 9/6257; G06K 2209/05; G06T 7/11;
  (Continued)

(56) References Cited

U.S. PATENT DOCUMENTS 8,577,130 B2 * 11/2013 Dewan ................. G06K 9/6209
                                              382/159
8,837,771 B2 *  9/2014 Lay ........................... G06T 7/11
                                              382/100

(Continued)

FOREIGN PATENT DOCUMENTS

EP    3 392 832 A1    10/2018

OTHER PUBLICATIONS

Australian Examination Report (Application No. 2020223750) dated Sep. 16, 2020.
Rajchl M., "DeepCut: Objection Segmentation from Bounding Box Annotations using Convolutional Neural Networks", IEEE Transactions on Medical Imaging, vol. 36, No. 2, Feb. 1, 2017.

(Continued)

*Primary Examiner* — Ping Y Hsieh
(74) *Attorney, Agent, or Firm* — Nixon Peabody LLP; Jeffrey L. Costellia

(57) ABSTRACT

An image segmentation method system, the system comprising: a training subsystem configured to train a segmentation machine learning model using annotated training data comprising images associated with respective segmentation annotations, so as to generate a trained segmentation machine learning model; a model evaluator; and a segmentation subsystem configured to perform segmentation of a structure or material in an image using the trained segmentation machine learning model. The model evaluator is configured to evaluate the segmentation machine learning model by (i) controlling the segmentation subsystem to segment at least one evaluation image associated with an existing segmentation annotation using the segmentation machine learning model and thereby generate a segmentation of the annotated evaluation image, and (ii) forming a comparison of the segmentation of the annotated evaluation image and the existing segmentation annotation. The method includes deploying the trained segmentation machine learning model for use if the comparison indicates that the segmentation machine learning model is satisfactory.

20 Claims, 11 Drawing Sheets

(52) U.S. Cl.
CPC ............ *G06T 7/11* (2017.01); *G06K 2209/05* (2013.01); *G06T 2207/20081* (2013.01); *G06T 2207/20084* (2013.01); *G06T 2207/30004* (2013.01)

(58) Field of Classification Search
CPC . G06T 2207/30004; G06T 2207/20081; G06T 2207/20084
See application file for complete search history.

(56) References Cited

U.S. PATENT DOCUMENTS

| | | | |
|---|---|---|---|
| 2005/0027664 A1* | 2/2005 | Johnson | G06F 40/45 706/12 |
| 2018/0082443 A1* | 3/2018 | Risman | G06T 15/08 |
| 2018/0114101 A1 | 4/2018 | Desai et al. | |
| 2018/0276815 A1 | 9/2018 | Xu et al. | |
| 2018/0300576 A1 | 10/2018 | Dalyac et al. | |
| 2019/0073447 A1 | 3/2019 | Guo et al. | |
| 2019/0156202 A1 | 5/2019 | Falk et al. | |
| 2020/0193604 A1* | 6/2020 | Myronenko | G06K 9/6262 |
| 2020/0334897 A1* | 10/2020 | Oved | G06T 11/003 |

OTHER PUBLICATIONS

Neeraj Kumar et al., "A Dataset and a Technique for Generalized Nuclear Segmentation for Computational Pathology", IEEE Transactions on Medical Imaging, Jan. 2017, pp. 1-11.
Australian Examination Report (Application No. 2019204365) dated Aug. 9, 2019.
Hong et al., "Deep Learning for Automatic IC Image Analysis", 2018 IEEE 23$^{rd}$ International Conference On Digital Signal Processing (DSP), IEEE, Nov. 19, 2018, pp. 1-5.
Piater et al., "Interactively Training Pixel Classifiers", International Journal Of Pattern Recognition and Artificial Intelligence, vol. 13, No. 2, Mar. 1999, pp. 171-193.
Partial European Search Report (Application No. 20177152.4) dated Nov. 2, 2020.
European Search Report for European Application No. 2177152, dated Mar. 18, 2021.
Berger et al.; "VAST (Volume Annotation and Segmentation Tool): Efficient Manual and Semi-Automatic Labeling of Large 3D Image Stacks", Frontiers in Neural Circuits vol. 12, pp. 1-15, Oct. 16, 2018.
Petroval et al.; "Semi-Automatic Image Annotation of Street Scenes", 2017 IEEE Intelligent Vehicles Symposium (IV), IEEE, pp. 448-455, Jun. 11, 2017.

\* cited by examiner

METHOD AND SYSTEM FOR IMAGE SEGMENTATION AND IDENTIFICATION

FIELD OF THE INVENTION

The present invention relates to a method and system for image segmentation and identification, and is of particular but by no means exclusive application in the segmentation and identification of medical images (such as of bones and other anatomical structures, masses, tissues, landmarks, lesions and pathologies), and in medical imaging modalities including Computed Tomography (CT), Magnetic Resonance (MR), Ultrasound, and Pathology Scanner imaging. The present invention also relates to a method and system for automating the annotation of medical image data for training machine learning models for use in segmentation and identification, and to evaluating and improving the machine learning models.

BACKGROUND

Accurate segmentation and identification of a medical image are required for quantitative analysis and disease diagnosis. Segmentation is the process of delineating an object (e.g. an anatomical structure or tissue) in a medical image from its background. Identification is the process of identifying the object and correctly labelling it. Conventionally, segmentation and identification are performed manually or semi-manually. The manual method requires an expert with sufficient knowledge in the field to draw the contours of a targeted object and label the extracted object.

There also exist computer-aided systems provide semi-manual segmentation and identification. For example, such a system may detect the approximate contour of an object of interest based on selected parameters including intensity, edge, 2D/3D curvature, shape or other 2D/3D geometric characteristics. An expert then refines the segmentation or identification manually. Alternatively, an experts may provide such a system with input data, such as the approximate location of a targeted object; the computer-aided system then performs segmentation and identification.

Both manual and semi-manual methods are labour intensive and time-consuming. Moreover, the quality of the results relies heavily on the expert's expertise. Significant variations in the resulting segmented and identified objects can arise depending on operator/expert.

In the last few years, machine learning, especially deep learning (e.g. deep neural networks or deep convolutional neural networks) has outperformed humans in many visual recognition tasks, including in medical imaging.

WO 2018/015414 A1 discloses a method and system for artificial intelligence based medical image segmentation. The method includes receiving a medical image of a patient, automatically determining a current segmentation context based on the medical image, and automatically selecting at least one segmentation algorithm from a plurality of segmentation algorithms based on the current segmentation context A target anatomical structure is segmented in the medical image using the selected at least one segmentation algorithm.

U.S. patent application publication no. 2018/0240235 A1 discloses a method for segmentation of an image of a target patient, comprising: providing a target 2D slice and nearest neighbour 2D slice(s) of a 3D anatomical image, and computing, by a trained multi-slice fully convolutional neural network (multi-slice FCN), a segmentation region including a defined intra-body anatomical feature that extends spatially across the target 2D slice and the nearest neighbour 2D slice(s), wherein the target 2D slice and each of the nearest neighbour 2D slice(s) are processed by a corresponding contracting component of sequential contracting components of the multi-slice FCN according to the order of the target 2D slice and the nearest neighbour 2D slice(s) based on the sequence of 2D slices extracted from the 3D anatomical image, wherein outputs of the sequential contracting components are combined and processed by a single expanding component that outputs a segmentation mask for the target 2D slice.

U.S. Pat. No. 9,589,974 discloses a system and method for applying deep convolutional neural networks to medical images to generate a real-time or near real-time diagnosis or diagnostic recommendation. The method includes performing image segmentation of a plurality of medical images, the image segmentation comprising isolating a region of interest from each image; applying a cascaded deep convolutional neural network detection structure to the segmented images, the detection structure comprising: i) a first stage employing a first convolutional neural network to screen all possible locations in each 2D slice of the segmented medical images by a sliding window methodology to identify one or more candidate locations; and ii) a second stage employing a second convolutional neural network to screen 3D volumes constructed from the candidate locations by selecting at least one random location within each volume with a random scale and a random viewing angle to identify one or more refined locations and classifying the refined locations; and automatically generating a report comprising a diagnosis or diagnostic recommendation.

However, there are problems in applying such techniques to segmentation and identification of medical images: machine learning algorithms require ground truth data for training and validation, but this data is produced by human experts annotating the data—which is time-consuming and expensive; the improvement of machine learning models replies ideally on the addition of erroneous results (such as when the trained model fails in segmentation or identification of a medical image), but it is difficult to manage the training and retraining processes efficiently; a high number of training images (ideally more than a thousand) are difficult or impossible to obtain in some biomedical applications and, with limited training data, it is difficult efficiently to train a segmentation and identification model.

SUMMARY

It is an object of the present invention to provide a segmentation system in which annotation may be integrated.

According to a first aspect, the invention provides an image segmentation system, comprising:
a training subsystem configured to train a segmentation machine learning model using annotated training data comprising images (such as medical images) associated with respective segmentation annotations, so as to generate a trained segmentation machine learning model;
a model evaluator; and
a segmentation subsystem configured to perform segmentation of a structure or material (comprising, for example, bone, muscle, fat or other biological tissue) in an image using the trained segmentation machine learning model;
wherein the model evaluator is configured to evaluate the segmentation machine learning model by (i) controlling the segmentation subsystem to segment at least one evaluation image associated with an existing segmentation annotation using the segmentation machine learning model and thereby generate a segmentation of the annotated evaluation image, and (ii) forming a comparison of the segmentation of the annotated evaluation image and the existing segmentation annotation; and deploying or releasing the trained segmentation machine learning model for use if the comparison indicates that the segmentation machine learning model is satisfactory.

Hence, the model evaluator evaluated the segmentation machine learning model using the segmentation subsystem employed, in use, to perform segmentation—providing an integrated training and segmenting system.

In an embodiment, the system is configured to deploy or release the model for use if the segmentation of the annotated evaluation image and the existing annotation agree to within a predefined threshold.

In an embodiment, wherein the system is configured to continue training the model if the segmentation of the annotated evaluation image and the existing annotation do not agree to within a predefined threshold. In an example, the system is configured to continue training the model by modifying a model algorithm and/or by adding additional annotated training data. This allows the predefined threshold to be tuned to the desired application, and refined if the initial tuning proves to be unsatisfactory.

In an embodiment, the training subsystem is configured to
receive (i) an image and an annotation for the image (portions of which may optionally be generated by the segmentation subsystem using the segmentation machine learning model), and (ii) a score associated with the annotation, the score being indicative of a degree of success or failure of the segmentation machine learning model in segmenting the image, wherein a higher score is indicative of failure and a lower weighting is indicative of success; and retrain or refine the segmentation machine learning model using the image and the annotation, including weighting the annotation of the image according to the score.

Hence, the segmentation machine learning model can be continually retrained or refined before or during deployment. It should be noted that, an annotation for the image may comprise a plurality of items of annotation information and that—optionally—portions of the annotation may be generated by the segmentation subsystem using the segmentation machine learning model.

In an embodiment, the training subsystem generates the segmentation machine learning model by refining or modifying an existing segmentation machine learning model.

In an embodiment, the system includes an annotation subsystem configured to form at least one of the annotated training images (i.e. a respective image with segmentation annotations) from an unannotated or partially annotated image by generating one or more candidate image annotations for the unannotated or partially annotated image, receiving inputs identifying one or more portions of the one or more of the candidate image annotations (where a portion may constitute an entire candidate image annotation), and forming the annotated training image from at least the one or more portions. In an example, the annotation subsystem is configured to generate at least one of the candidate image annotations using a) a non-machine learning image processing method or b) the segmentation machine learning model.

Thus, the annotation subsystem can be used to indicate the merit of an annotation (which may be been generated by a non-machine learning image processing method), such that valid portions of the annotation can be retained and used.

In an embodiment, the system further comprises an identification subsystem, wherein the annotated training data further comprise identification annotations, and the segmentation machine learning model is a segmentation and identification machine learning model.

Combining the annotation subsystem and the segmentation subsystem facilitates continuous improvement of the segmentation system, which is advantageous in the application of artificial intelligence to medical image analysis.

In an embodiment, the system further comprises an identification subsystem, wherein the annotated training data further comprise identification annotations and the training subsystem is further configured to train an identification machine learning model using (i) the annotated training data once the respective images have been segmented by the segmentation machine learning model and (ii) the identification annotations.

The training subsystem may include a model trainer configured to employ machine learning to train the segmentation machine learning model to determine a class of each pixel/voxel on the image. The model trainer may employ, for example, a support vector machine, a random forest tree or a deep neural network.

The structure or material may comprises bone, muscle, fat or other biological tissue. For example, segmentation may be of bone from non-bone material (such as surrounding muscle and fat), or one bone from another bone.

According to a second aspect, the invention provides a computer-implemented image segmentation method, comprising:

training a segmentation machine learning model using annotated training data comprising respective images (such as medical images) and segmentation annotations, so as to generate a trained segmentation machine learning model;

evaluating the segmentation machine learning model by
(i) segmenting at least one evaluation image associated with an existing annotation using the segmentation machine learning model and thereby generate a segmentation of the annotated evaluation image, and (ii) forming a comparison of the segmentation of the annotated evaluation image and the existing annotation; and deploying or releasing the trained segmentation machine learning model for use when the comparison indicates that the segmentation machine learning model is satisfactory.

In an embodiment, the method includes deploying or releasing the model for use if the segmentation of the annotated evaluation image and the existing annotation agree to within a predefined threshold.

In an embodiment, the method includes continuing to train the model if the segmentation of the annotated evaluation image and the existing annotation do not agree to within a predefined threshold. In an example, the method includes continuing to train the model by modifying a model algorithm and/or by adding additional annotated training data.

In an embodiment, the training includes
receiving (i) an annotated image for use in retraining or refining the segmentation machine learning model, and (ii) a score associated with the annotated image, the score being indicative of a degree of success or failure of the segmentation machine learning model in segmenting the annotated image, wherein a higher score is indicative of failure and a lower weighting is indicative of success; and weighting the annotated image according to the score in the retraining or refining of the segmentation machine learning model.

In an embodiment, the method includes generating the segmentation machine learning model by refining or modifying an existing segmentation machine learning model.

In an embodiment, the method includes forming at least one of the annotated training images from an unannotated or partially annotated image by generating one or more candidate image annotations for the unannotated or partially annotated image, receiving inputs identifying one or more portions of the one or more of the candidate image annotations, and forming the annotated training image from at least the one or more portions. In an example, the method includes generating at least one of said candidate image annotation using a) a non-machine learning image processing method, or b) the segmentation machine learning model.

In an embodiment, the annotated training data further comprise identification data, and the method includes training the segmentation machine learning model as a segmentation and identification machine learning model.

In an embodiment, the annotated training data further comprise identification annotations and the method includes training an identification machine learning model using (i) the annotated training data once the respective images have been segmented by the segmentation machine learning model and (ii) the identification annotations.

The method may include employing machine learning (comprising, for example, a support vector machine, a random forest tree or a deep neural network) to train the segmentation machine learning model to determine a class of each pixel/voxel on the image.

According to a third aspect, the invention provides an image annotation system, comprising:

an input for receiving an unannotated or partially annotated image (such as a medical image); and an annotator configured to form an annotated training image from the unannotated or partially annotated image by generating one or more candidate image annotations for the unannotated or partially annotated image, receiving inputs identifying one or more portions of the one or more of the candidate image annotations (where a portion may constitute an entire candidate image annotation), and forming the annotated training image from at least the one or more portions.

In an embodiment, the annotator is configured to generate at least one of the candidate image annotations using a) a non-machine learning image processing method or b) a segmentation machine learning model (such as of the type discussed above).

According to a fourth aspect, the invention provides an image annotation method, comprising:

receiving or accessing an unannotated or partially annotated image; and forming an annotated training image from the unannotated or partially annotated image by generating one or more candidate image annotations for the unannotated image, receiving inputs identifying one or more portions of the one or more of the candidate image annotations, and forming the annotated training image from at least the one or more portions.

In an embodiment, the method includes generating at least one of said candidate image annotation using a) a non-machine learning image processing method, or b) the segmentation machine learning model.

According to a fifth aspect, the invention provides computer program code configured, when executed by one or more processors, to implement the method of either the second or fourth aspect. This aspect also provides a computer readable medium (which may be non-transitory), comprising such computer program code.

Thus, certain aspects of the invention facilitate the continual training and evaluation of machine learning (e.g. deep learning) models with an integrated annotation and segmentation system.

The annotation system, which does not merely use human annotated/identified images, advantageously combines segmented/identified results obtained by image processing algorithms, an annotation deep learning model, a correction model, and a segmentation model. Human input is the only last step to check or correct the annotation if needed. As more images are annotated, better become the deep learning models, and less human input is required. It has been found that, in many cases, accurate annotation can be obtained by combining segmented/identified results obtained by different models (annotation, correction, segmentation/identification models).

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention may be more clearly ascertained, embodiments will now be described by way of example with reference to the following drawing, in which.

DETAILED DESCRIPTION

Figure 1A:
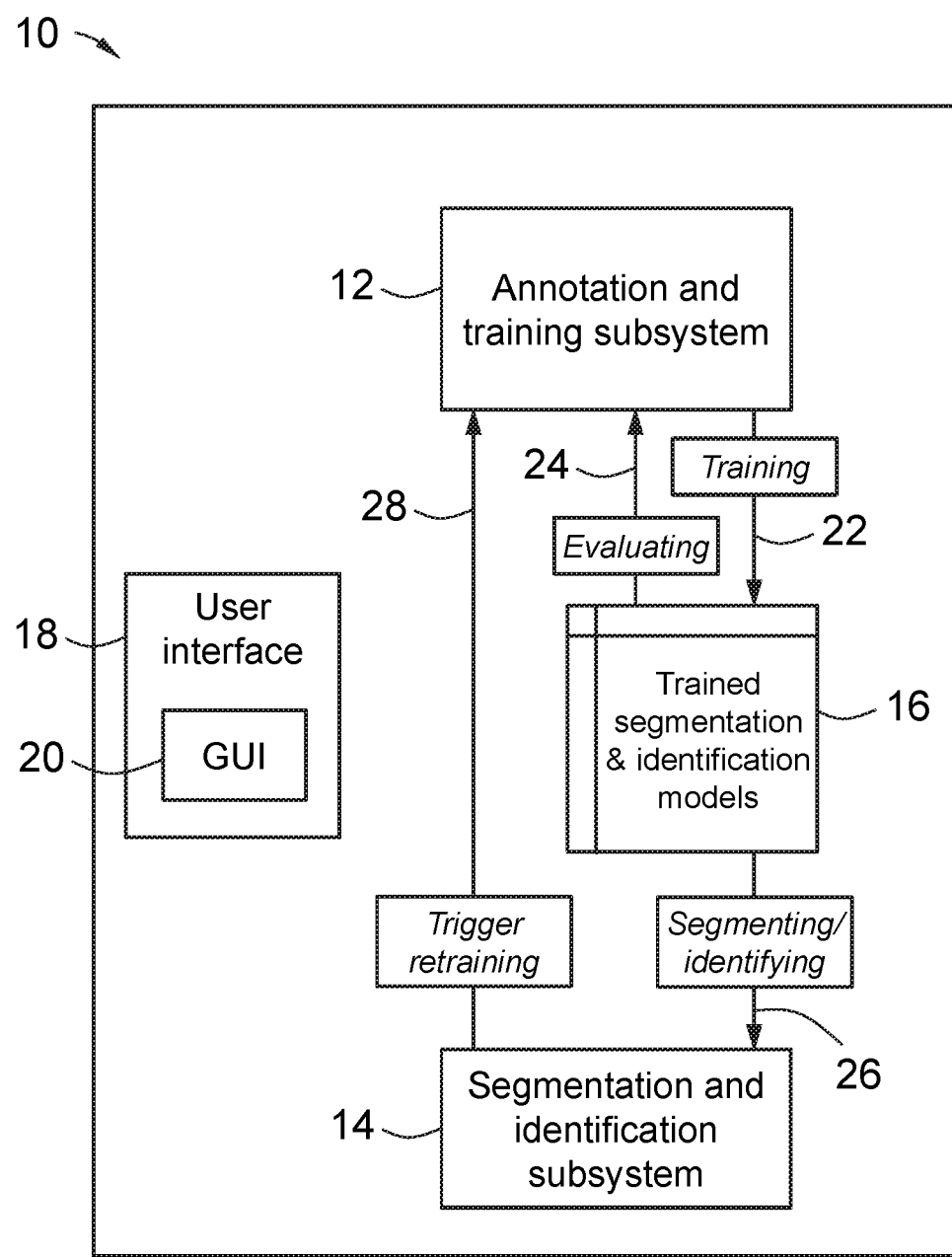
FIG. 1A is a schematic architectural of a segmentation and identification system, with built-in annotating and training functionality, according to an embodiment of the present invention.

FIG. 1A is a schematic architectural view of a segmentation and identification system 10, with built-in annotating and training functionality. System 10 includes an annotation and training subsystem 12, a segmentation and identification subsystem 14, a trained segmentation and identification models 16, and a user interface 18 that includes a graphical user interface (GUI) 20.

Broadly, annotation and training subsystem 12 is configured to annotate medical images selected as training data, with 'ground truth' (the targeted anatomical structures or tissues) under the supervision of operators with domain knowledge. The annotated training data is fed into machine learning algorithms (such as deep learning algorithms) to train a segmentation and identification model (to be stored in trained segmentation and identification models 16). The trained segmentation and identification models are used 26 by segmentation and identification subsystem 14 to segment and identify objects of interest in new medical images, including classifying and labelling pixels/voxels of the images.

GUI 20 may be implemented in different ways, such as a GUI installed as software on a computing device (e.g. a personal computer, laptop, a tablet computer or a mobile telephone) used by annotators (i.e. suitably skilled operators that can recognize features of an image and hence annotate the features). In another example, GUI 20 can be provided to the annotators as a web page, accessed with a web browser.

In addition to training 22 segmentation and identification models using annotated images, annotation and training subsystem 12 evaluates 24 the performance of trained segmentation and identification models 16 so that it can determine when a model is ready for deployment, and also retrain and improve the models.

If, nonetheless, a segmentation and identification model fails with one or more particular images, the images in respect of which the model failed are added to annotation and training subsystem 12 as a new training data set; the relevant segmentation and identification model is then retrained 28.

Figure 1B:
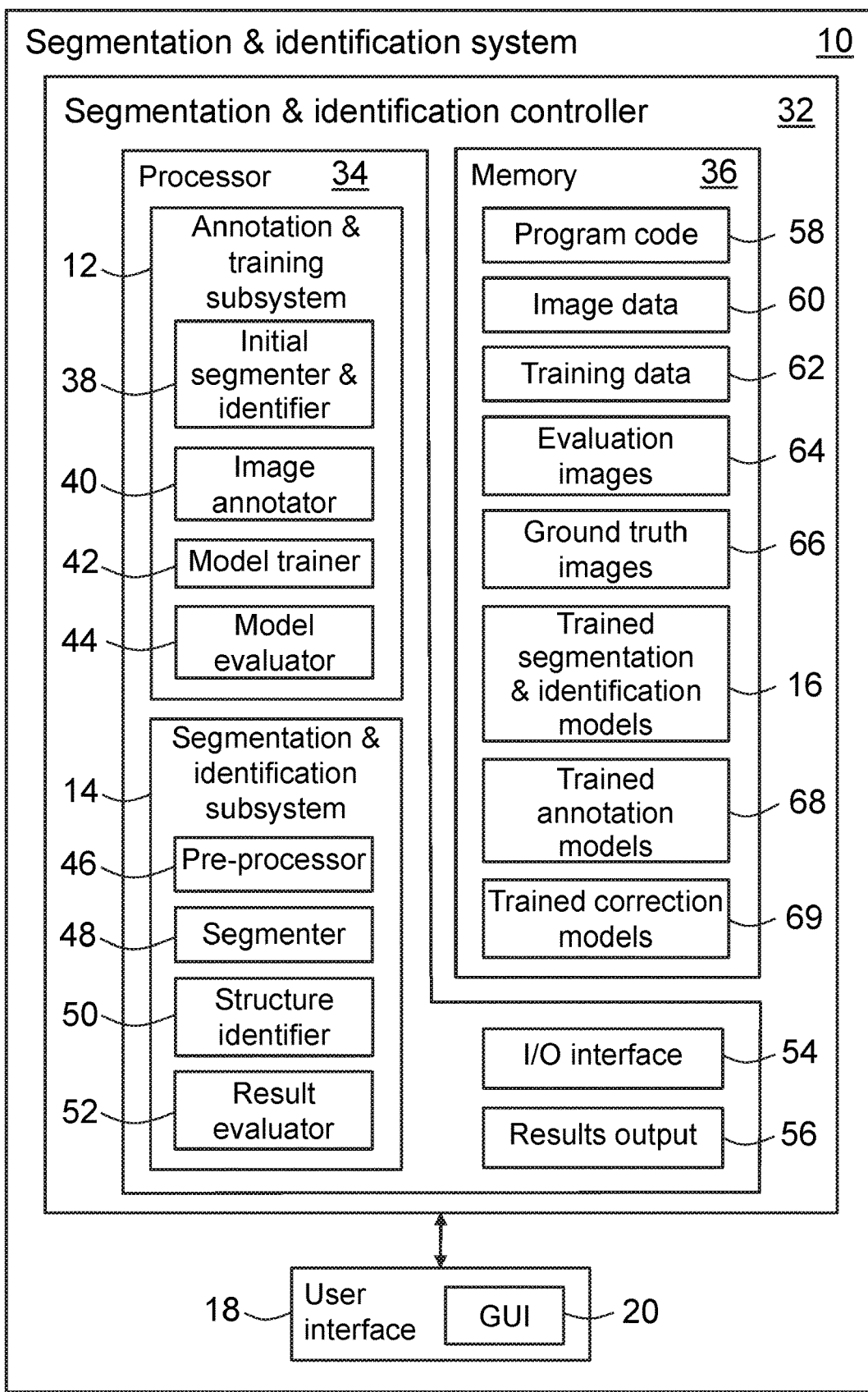
FIG. 1B is a schematic view of the segmentation and identification system of FIG. 1A, according to an embodiment of the present invention.

FIG. 1B is a schematic view of system 10. System 10 includes a segmentation and identification controller 32 and the aforementioned user interface 18. Segmentation and identification controller 32 includes at least one processor 34 (or, in some embodiments, a plurality of processors) and memory 36. System 10 may be implemented, for example, as a combination of software and hardware on a computer (such as a personal computer or mobile computing device), or as a dedicated image segmentation system. System 10 may optionally be distributed; for example, some or all of the components of memory 36 may be located remotely from processor 34; user interface 18 may be located remotely from memory 36 and/or from processor 34 and, indeed, may comprise a web browser and a mobile device application.

Memory 36 is in data communication with processor 34, and typically comprises both volatile and non-volatile memory (and may include more than one of each type of memory), including RAM (Random Access Memory), ROM and one or more mass storage devices.

Processor 34 includes an annotation and training subsystem 12 and a segmentation and identification subsystem 14. As is discussed in greater detail below, annotation and training subsystem 12 includes an initial segmenter and identifier 38 (which processes original images according to a non-machine learning image processing method), an image annotator 40, a model trainer 42 and a model evaluator 44. Segmentation and identification subsystem 14 includes a pre-processor 46, a segmenter 48, a structure identifier 50, and a result evaluator 52. Processor 34 also includes an I/O interface 54 and a results output 56.

Memory 36 includes program code 58, image data 60, training data 62, evaluation images 64, ground truth images 66, the trained segmentation and identification models 16, trained annotation models 68, and trained correction models 69.

Segmentation and identification controller 32 is implemented, at least in part, by processor 34 executing program code 58 from memory 36.

In broad terms, I/O interface 32 is configured to read or receive image data (such as in DICOM format) pertaining to subjects or patients into image data 60 or training data 62, for use in—respectively—analysis and/or training (or in both, as discussed below). Once system 10 has segmented and identified structures from the image data 60, I/O interface 54 outputs the results of the analysis (optionally in the form of a report) via, for example, results output 56 and/or to GUI 20.

Figure 2:
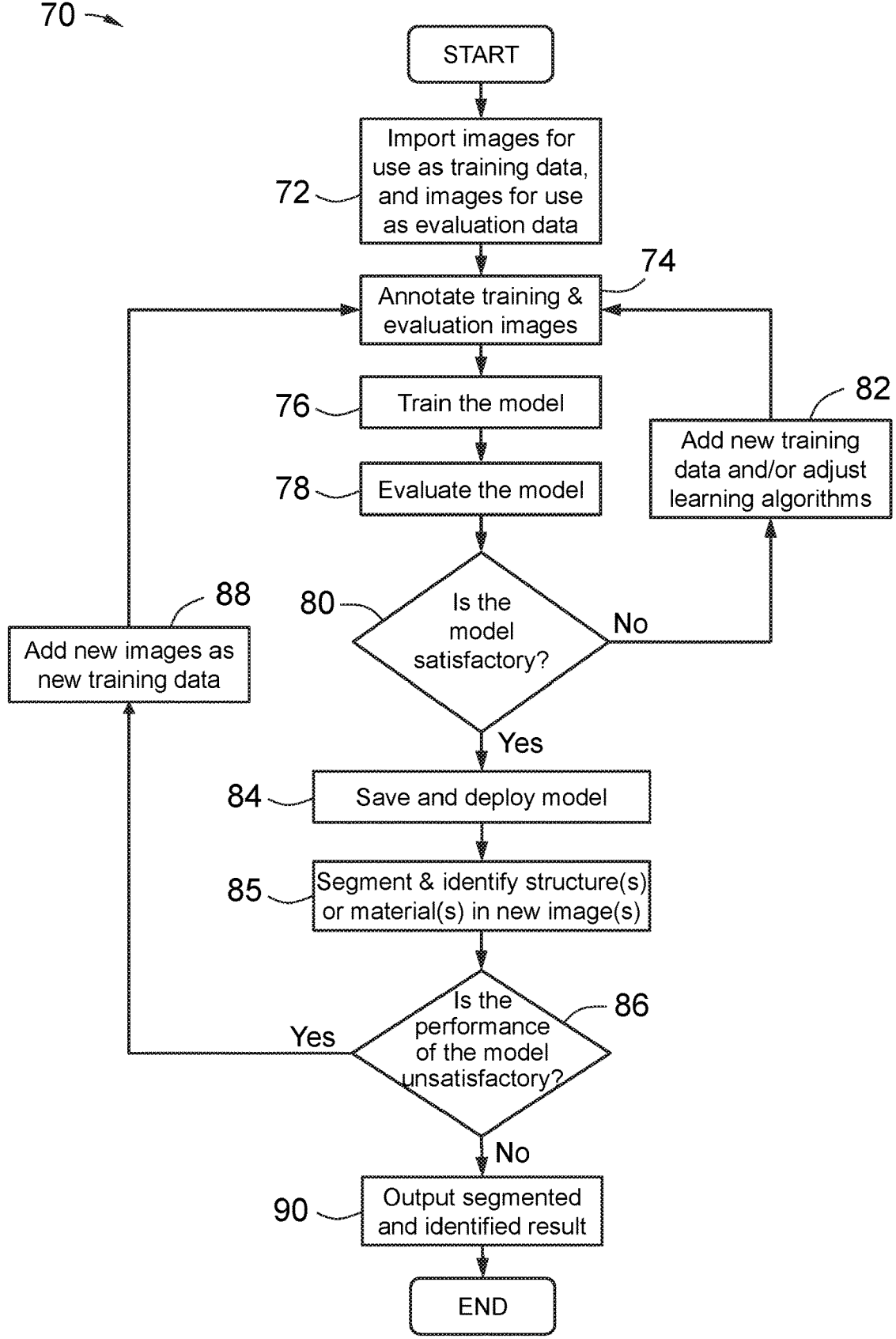
FIG. 2 is a flow diagram of the general workflow of the system of FIGS. 1A and 1B.

FIG. 2 is a flow diagram 20 of the general workflow of system 10. At step 72, a first set of images are imported (typically from a database of such images, stored either remotely or locally) to be used as training images/data. These images are input into system 10 via I/O interface 54 and stored in training data 62. Training data 62 should be representative of images expected to be encountered in a clinical setting, and should comprise both base cases and edge cases (i.e. 'normal' and 'extreme' cases respectively). Structure and tissues in base cases are easier to segment or identify than those in the edges cases. For example, in CT scans of a wrist, it is necessary to segment bone from surrounding muscle and fat. The task is easier in the scans of young and healthy subjects where the bone boundary is less porous so clearer than in the scans of old and fragile patients where the bone is very porous and the boundary is less clear. Nonetheless, it is desirable to collect examples of both base and edge cases for use as training data.

At this step, a second set of images is also imported for use in evaluating the performance of the model being trained. These evaluation images for use in the evaluation should be representative clinical images, and are stored in evaluation images 64.

At step 74, operators with suitable expertise use image annotator 40 to annotate both training data 62 and evaluation images 64. Different applications require different annotation. For example, if the model is to be trained for segmenting bone from non-bone material, the annotation is required to differentiate and identify the pixels/voxels of bone from those of non-bone and thus comprise segmentation data; if the model goes further such that it is necessary to identify each piece of bone, the annotation should also differentiate and label the pixels/voxels of each bone and thus additionally include identification data.

At step 76, model trainer 42 uses annotated training data 62 to train a classifier model, in this embodiment in the form of a segmentation and identification model, which is a classifier that determines the classes of each pixel/voxel on the image. The model training aims to determine a decision pattern from the input (the training images) to the ground truth (the annotations). The model may be trained by utilising machine learning algorithms, such as a support vector machine or a random forest tree.

This embodiment employs a deep neural network. As discussed below (cf. FIG. 6), this deep neural network consists of an input layer, an output layer, and layers between them. Each layer consists of artificial neurons. An artificial neuron is a mathematical function that receives one or more inputs and sums them to produce an output Usually, each input is separately weighted, and the sum is passed through a non-linear function. As the neural network learns, the weights of the model are adjusted in response to the error (the difference between the network output and the annotations) it produces until the error cannot be reduced any more.

At step 78, model evaluator 44 evaluates the trained model, by controlling segmentation and identification subsystem 14 to perform segmentation and identification on the evaluation images using that model. At step 80, model evaluator 44 checks whether the trained model proved satisfactory, by comparing the results of that process with the annotations employed in step 74. In this embodiment, this is done by determining whether a difference between the results generated by the trained model and the annotation data associated with the annotated images (or 'ground truth images') 66 employed in step 74 are below a predefined threshold. For example, the difference may be calculated as the ratio of the overlap of the segmentation generated by the model and the segmentation implied by the annotation data, and the segmentation implied by the annotation data. If they agree entirely, the overlap will clearly be 100%—implicitly a satisfactory result In some applications, this threshold is set to 90%.

If, at step 80, model evaluator 44 determines that the model is not satisfactory, processing continues at step 82: one or more new images are imported (to supplement the original training data), as the original training data was at step 72, and/or the learning algorithms are adjusted/changed (such as by tuning the parameters of the neural network, modifying the layers of the neural network or modify the activation function of the neurons of the neural network). Processing then returns to step 74.

If, at step 80, model evaluator 44 determines that the difference between the results generated by the trained model and the annotations employed in step 74 are below the predefined threshold, and hence that the trained model is satisfactory, processing continues at step 84 where the trained model is stored (as one of trained segmentation and identification models 16) and hence deployed. The training phase is (at least for the present) complete, so—at step 85—the trained model is used by segmentation and identification subsystem 14 to segment and identify one or more structures or materials/tissues in new medical images that have been input and also stored in image data 60. At step 86, result evaluator 52 checks the result of this segmentation and identification by comparing the result against one or more pre-defined criteria or parameters known to chracterize the targeted structure or material. If this check indicates that the performance of the segmentation and identification model was unsatisfactory, processing continues at step 88, where the new images are added into the training set as new training data, and processing continues at step 74 (where these images are annotated, and used to retrain the model, etc).

If, at step 86, result evaluator 52 does not find that the result was unsatisfactory, processing continues at step 90 where the segmented and identified result from the new medical images are outputted, such as by being displayed by user interface 18 of system 10. (Step 86 may optionally involve, should result evaluator 52 not find the result to be unsatisfactory, displaying the segmentation and identification result to a user so that the user may perform a supplementary manual check. If the user then flags the result as unsatisfactory (such as by selecting an 'unsatisfactory' or 'reject' button on GIU 20), the result is deemed to be unsatisfactory and processing continues at step 88. If the user does not disagree with the determination of result evaluator 52, which the user may indicate by selecting a 'satisfactory' or 'accept button on GIU 20, processing continues at step 90.)

After step 90, processing then ends: the result may be used, for example, for diagnostic purposes or as the input of a further quantitative analysis.

Figure 3:
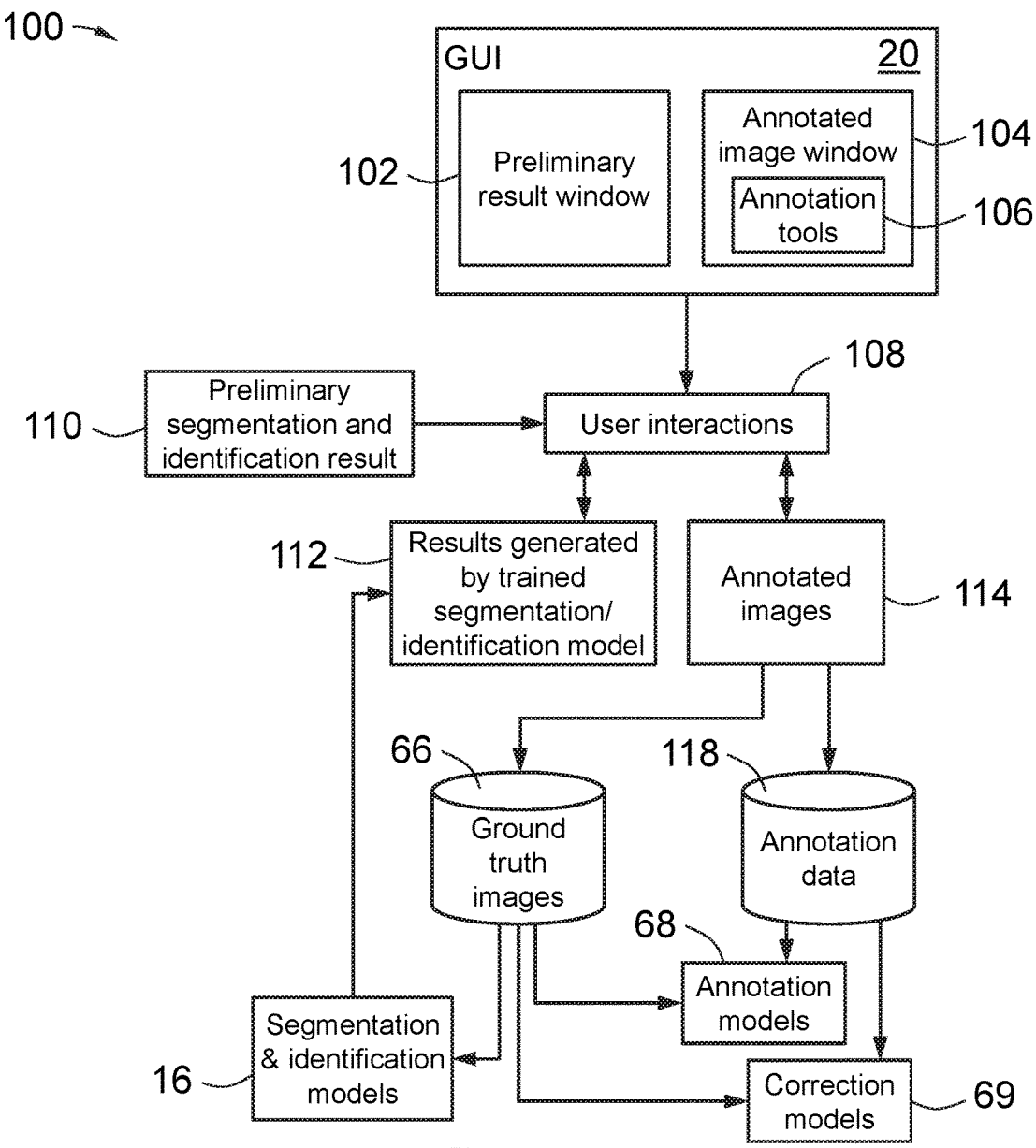
FIG. 3 is a quasi-flow diagram of the operation of the system of FIGS. 1A and 1B.

FIG. 3 is a quasi-flow diagram 70 of the operation of system 10. As discussed above, annotation and training subsystem 12 is configured to annotate the segmentation and identification performed on medical images. The medical images and their annotation are used for training the segmentation and identification models. The annotators annotate a set of medical images via GUI 20, which may also be referred to in this embodiment as an annotation interface.

The annotator combines information from different resources to complete the annotation. In this embodiment, the annotator combines the information from one or more candidate image annotations, then uses annotation tools of GUI 20 to complete the annotation if necessary. In this embodiment, a candidate image annotation may be in the form of a preliminary segmentation and identification result generated using an existing non-machine learning image processing method or a result generated by a partially trained segmentation and identification model. The candidate image annotations are displayed together (e.g. adjacent to one another) so that the annotator may readily compare which portions of each are best.

It will also be appreciated that, as the preliminary segmentation result is generated using an existing image processing method, the preliminary results typically require improvement. An example of an existing image processing method is contour detection, blob detection, or threshold-based object segmentation. These techniques, though fast in segmenting bone pixels from surrounding pixels in a CT scan, provide in many cases an approximate or rough preliminary segmentation.

Figure 4:
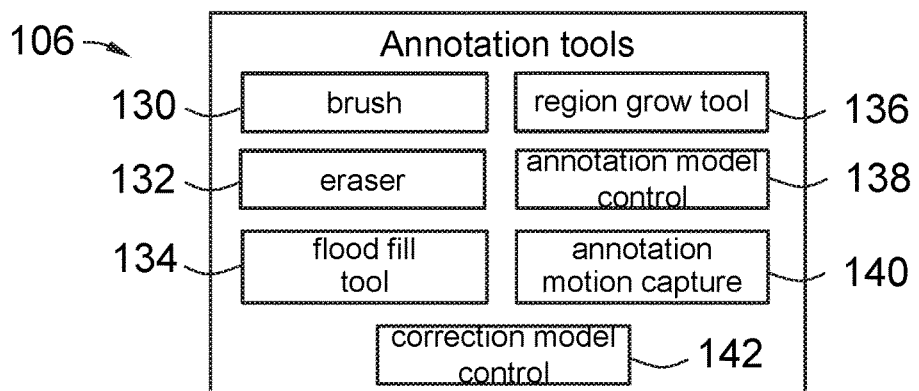
FIG. 4 is a schematic view of the annotation tools of the system of FIGS. 1A and 1B.

GUI 20 includes a preliminary result window 102 and an annotated image window 104; annotated image window 104 includes a plurality of annotation tools 106. Annotation tools 106 include both manual and semi-manual annotation tools, displayable to and manipulable by an annotator. These tools are depicted schematically in FIG. 4, and include manual tools including a brush 130 and an eraser 132. Brush 130 can be controlled by an annotator to label the pixels of different structures or material into different values or colours; eraser 132 can be controlled by an annotator to remove over-segmented or over-identified pixels from targeted structures or material. The semi-manual annotation tools include a flood fill tool 134 that can be controlled by an annotator to draw a contour enclosing a targeted structure or material prompting annotated image window 104 to annotate all of the pixels/voxels inside that contour, and a region grow tool 136 that can be controlled by an annotator, after having annotated a small part of a targeted structure or material, to control annotated image window 104 to expand the annotation to cover the entire structure or material.

System 10 also includes a machine learning based tool to help an annotator perform precise segmentation and identification quickly. For example, annotations tools 106 include a machine learning based annotation model control 138 that invokes a trained annotation model stored in annotation models 68. The annotation model 68 can be controlled by an annotator to select a plurality of points for use by annotation model 68 to segment the object In this embodiment, annotation model 68 prompts the annotator to identify the four extreme points of the object, that is, the left-most, rightmost, top and bottom pixels, which the annotator does by—for example—touching the image (when displayed on a touch-screen) with a stylus, or by using a mouse to select each of the points in turn. Annotation model 68 then employs these extreme points to segment the object Thus, the selected points (e.g. the extreme points) constitute annotation data 118 for use in training annotation model 68.

Annotator tools 106 includes an annotation motion capture tool 140, another mechanism for recording annotation data 118 and that can be activated by an annotator. The motions are recorded by system 10 to train a correction model (stored in trained correction models 69). For example, an annotator may move inward a contour of over-segmentation or move outward a contour of under-segmentation. The inward or outward motions and the locations where they are performed are recorded by annotation motion capture tool 140 as an input for training a correction model (stored in trained correction models 69). Moreover, annotation motion capture tool 140 records the amount of effort, such as the number of mouse motions and amount of mouse scrolling, and used to give more weight to the challenging cases during training.

Thus, returning to FIG. 3, in use an preliminary segmentation and identification result 110 is presented to an annotator via preliminary result window 102 of GUI 20. If the annotator is satisfied with the acccuracy of preliminary segmentation and identification result 110, the annotator moves the preliminary result 110 to annotated image window 104 of GUI 20, such as by clicking a mouse on preliminary result window 102; if the annotator is satisfied with only a part (but not all) of preliminary result 110, the annotator moves the satisfactory part only of preliminary result 110 into annotated image window 104, then uses annotation tools 106 of annotated image window 104 to correct or complete segmentation and identification.

If the annotator is not satisfied with any part of the preliminary segmentation and identification result, the annotator annotates the image from scratch using annotation tools 106.

When the annotator has either completed the annotation of a partially satisfactory preliminary result 110 or annotated the image him- or herself, the set of annotated original images 114 are now in annotated image window 104, and are stored as ground truth images 66.

After the one or more ground truth images 66 are collected in this manner, a segmentation and identification model is trained using the annotated original images, that is, ground truth images 66. When a trained segmentation and identification model is available (in trained segmentation and identification models 68), the segmentation and identification generated using that trained model is also provided to the annotator for reference. If the annotator is satisfied with a result generated by trained a segmentation and identification model, or with part of such a result, the annotator moves the satisfactory part into annotated image window 104. The annotator can combine the satisfactory part of the preliminary result and satisfactory part from the trained model in annotated image window 104. If there is still any unsatisfactorily annotated images or part-images, the annotator can use annotation tools 106 to the correct or supplement the annotation.

The collected ground truth images in ground truth images 66, along with the original images 60, are used to train the segmentation and identification model. Another set of ground truth images and original images are used to evaluate the trained model. In some embodiments, the same images are used for both training and evaluating. If the performance of the trained model on evaluating images is satisfied, the model is delivered to trained segmentation and identification models 68 that is used by segmentation and identification subsystem 14 to process any new images; if the performance is not satisfactory, more ground truth images are collected. The criterion or criteria employed by system 10 when evaluating a model (i.e. determining whether a segmentation and identification model is satisfactory) can be adjusted; such adjustment is typically performed by the developer of system 10 or whoever first trained the model, adjusted according to the application's requirements. For example, for vBMD (volumetric bone mineral density) determination, the criteria will be set to check whether the entire bone is accurately segmented from the surrounding material; for the for calculating cortical porosity, the criteria will be set to check the segmentation accuracy of the entire bone and also the cortical bone.

Figure 5:
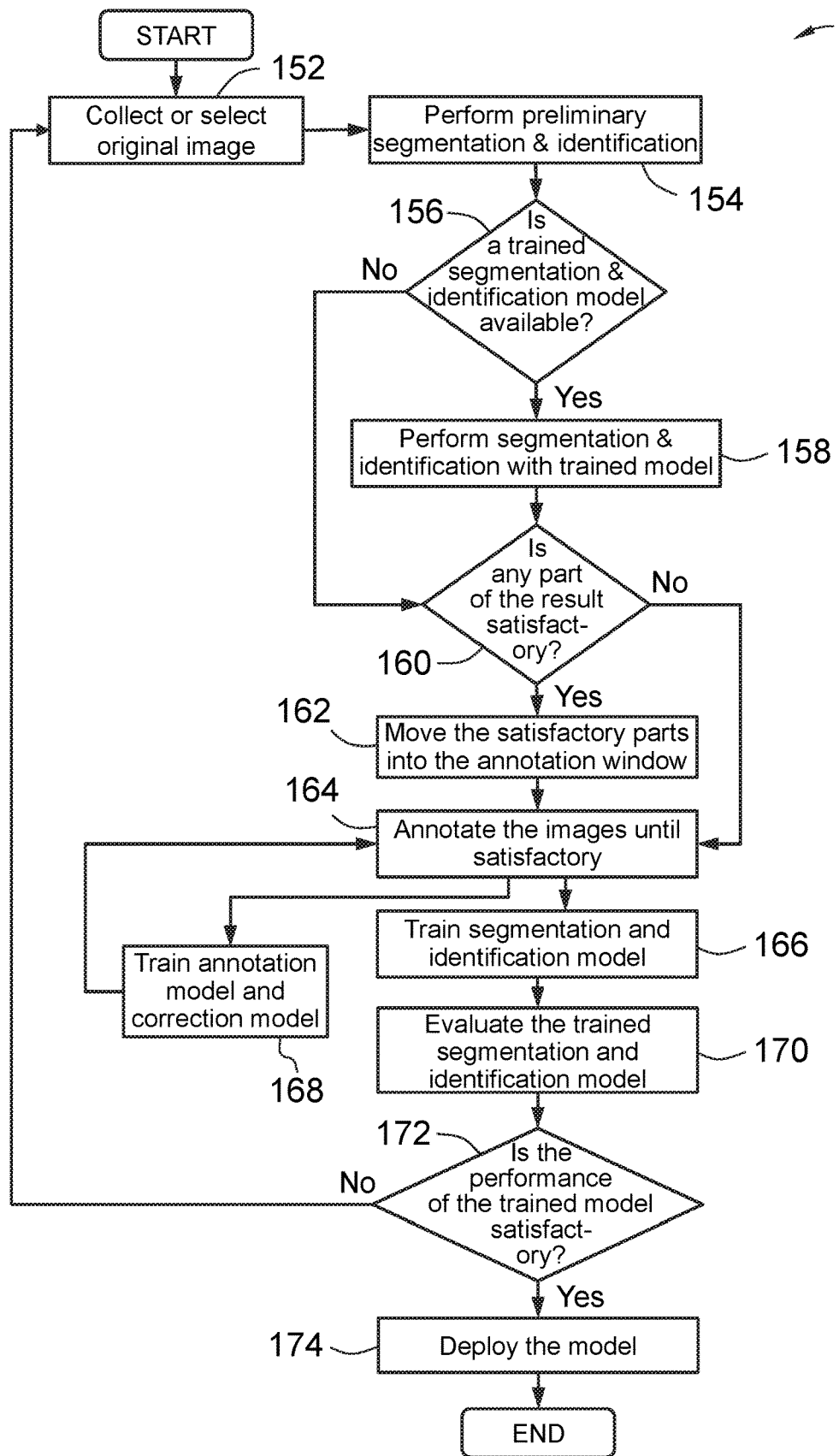
FIG. 5 is a flow diagram 70 of the annotating and training workflow of the system of FIGS. 1A and 1B.

FIG. 5 is a flow diagram 150 of the annotating and training workflow. Referring to FIG. 5, at step 152 an original image 60 is selected or inputted and, at step 154, the original image is processed by initial segmenter and identifier 38, thereby generating preliminary segmentation and identification results. Processing then continues at step 156, where segmenter 48 determines whether a trained segmentation and identification model is available in trained segmentation and identification models 16; if so, processing continues at step 158 where original image 60 is also processed with a trained segmentation and identification model 16. Processing then continues at step 160. If, at step 156, system 10 determines that a trained segmentation and identification model is not available, processing passes to step 160.

At step 160, an annotator uses system 10 to check whether any parts of the preliminary model results and trained model generated results are satisfactory (typically by inspecting these results on a display of user interface 18); if so, processing continues at step 162, where the annotator uses annotation tools 106 to move satisfactory parts to annotated image window 104, then processing continues at step 164. If at step 160 the annotator determines that no part of the obtained results is satisfactory, processing continues at step 164.

At step 164, the annotator is prompted to annotate the image, from scratch if no part of the obtained results were satisfactory, or to complete, correct and supplement the annotation otherwise. The annotator does so by controlling the manual and semi-manual annotation tools 106 until the annotation is satisfactory. An annotator may optionally also use correction model control 142 to invoke a correction model 69 to improve the annotations (if a correction model 69 is available).

At step 166, the segmentation and identification model is trained using the ground truth image and annotation data, and—in parallel at step 168—the ground truth image and annotation data are used to train annotation model(s) 68 and correction model(s) 69. (It will be noted that, if at step 164 no correction model is available, after the generation of a correction model at step 168, a correction model will be available in correction models 69 for use in subsequent passes through step 164.)

Processing continues at step 170, where the trained segmentation and identification model is evaluated by model evaluator 44 of annotation and training subsystem 12. At step 172, the results of that evaluation are checked and, if satisfactory, processing continues at step 174 where the trained segmentation and identification model is saved to trained segmentation and identification models 68 and deployed for use in processing new images 60; otherwise, processing returns to step 152, where one or more additional ground truth images 66 are collected or selected, and the process is repeated.

New images are processed by segmentation and identification subsystem 14, which segments and identifies a targeted structure or material (such as a tissue). As discussed above, segmentation and identification subsystem 14 comprises four modules: pre-processor 46, segmenter 48, structure identifier 50, and result evaluator 52. Pre-processor 46 verifies the validity of input images (in this embodiment, medical images), including checking whether the information of the medical image is complete and whether the image has been corrupted. Pre-processor 46 also reads the medical image into image data 60 of system 10. The images may come in different formats, and pre-processor 46 is configured to read images in the principal relevant formats, including DICOM. In addition, as multiple trained segmentation and identification models 16 may be available, pre-processor 46 is configured to determine which of trained segmentation and identification models 16 should be employed to perform segmentation and identification, based on the information that pre-processor 46 extracts from the image. For example, in one scenario, two classifier models may have been trained, a first classifier model for segmenting and identifying a radius bone from a wrist CT scan, and a second classifier model for segmenting and identifying the tibia bone from a leg CT scan. If a new CT scan in DICOM format is to be processed, pre-processor 46 will extract the scanned body site information from the DICOM header to determine that, for example, the radius classifier model should be used.

Segmenter 48 and structure identifier 50 respectively segment and identify a targeted structure or material in the image using a model selected from trained segmentation and identification models 68; the results of the segmentation and identification are then automatically evaluated by result evaluator 52. In this embodiment, the evaluation conducted by result evaluator 52 involves checking the result against one or more pre-defined criteria or parameters of the targeted structure or material, such as the accepted range of one or more of the structure or material's dimensions or the structure or material's volume, to determine whether the segmentation and identification result is not clearly be unsatisfactory. Results evaluator 50 outputs a result that indicates whether the segmentation and identification result is indeed satisfactory.

The automatic evaluation conducted by result evaluator 52 may be augmented manually; for example, the results of the segmentation and identification and/or the evaluation of result evaluator 52 may be displayed to a user (such as a doctor) for further evaluation, so that the automatic evaluation may be refined.

An image whose segmentation and identification result is found to be unsatisfactory is used as an additional training image to retrain the segmentation and identification model. If the segmentation and identification result is found to be satisfactory by result evaluator 52, the segmentation and identification result is outputted via I/O interface 54 to results output 56 and/or user interface 18 (e.g. on a display of a computer or mobile device). In some other embodiments, the segmentation and identification result or results are used as the input to further quantitative analysis. For example, if a radius bone is segmented and identified by system 10 from a wrist CT scan, attributes such as volume and density of the extracted radius bone may be passed to another application (running either locally or remotely) for some other, further analysis.

Figure 6:
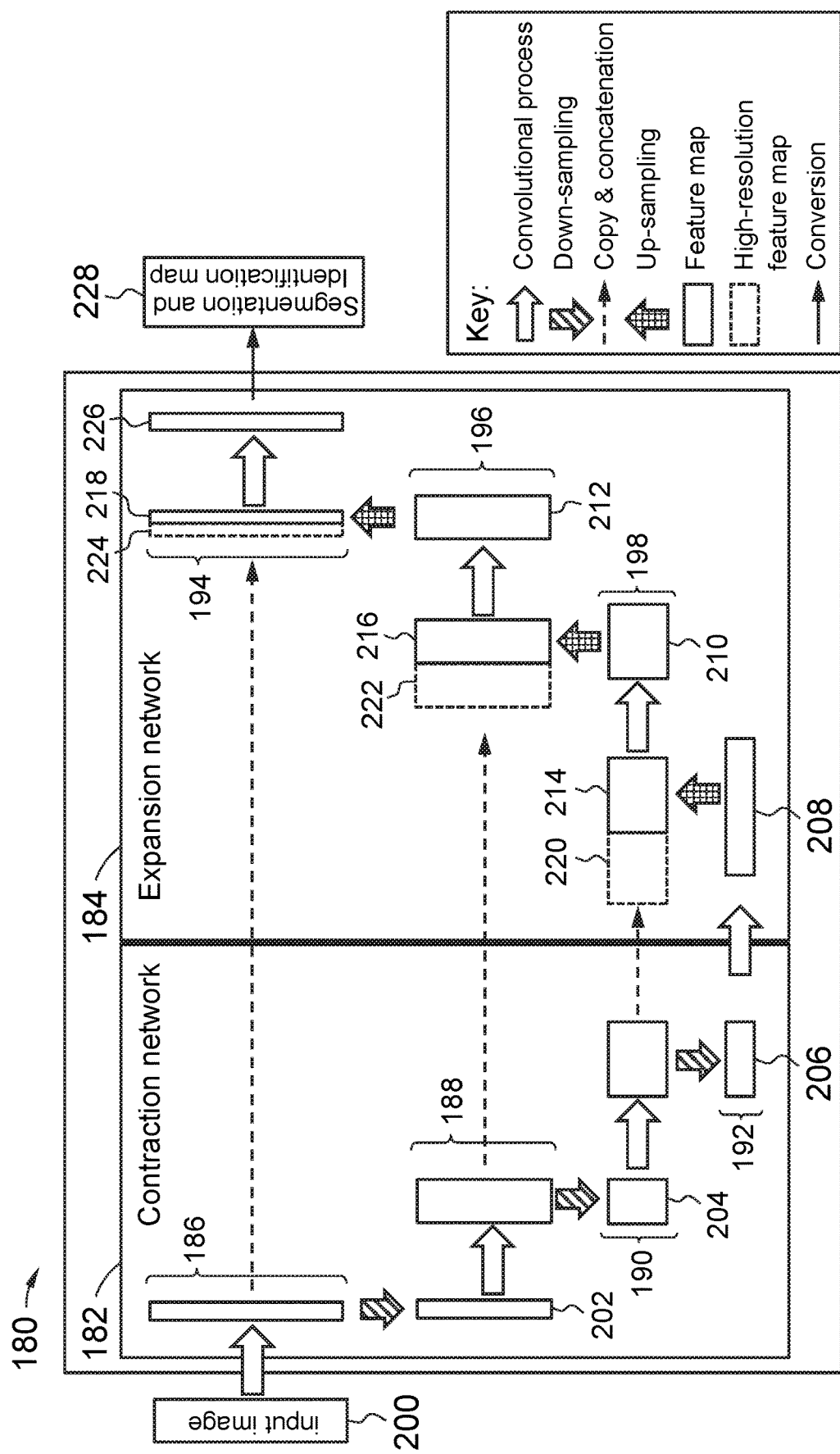
FIG. 6 is a schematic view of a deep learning segmentation and identification model of the system of FIGS. 1A and 1B.

A convolution neural network for segmentation and identification in the form of a deep learning segmentation and identification model according to an embodiment of the present invention is shown generally at 180 in FIG. 6. Deep learning segmentation and identification model 180 comprises a contraction convolutional network (CNN) 182 and an expansion convolutional network (CNN) 184. The contraction or the down-sampling CNN 182 processes an input image into feature maps that reduce their resolution through layers. The expansion or the up-sampling CNN 184 processes these feature maps through layers that increase their resolution and eventually generate a mask of segmentation and identification.

In the example of FIG. 6, contraction CNN 182 has four layers 186, 188, 190, 192 and expansion CNN has four layers 194, 196, 198, 192, though it will be noted that other numbers of layers may be employed in each. The lowest layer (viz. layer 192) is shared by the contraction and expansion networks 182, 184. Each layer 186, . . . , 198 has the input and the feature map (shown as a hollow box in each layer). The input of each layer 186, . . . , 198 is processed and converted into a feature map by a convolutional process (shown as hollow arrows in the figure). The convolutional process, or the activation function, may be—for example—a rectified linear unit, a sigmoid unit or a Tan h unit.

In contraction CNN 182, the input of first layer 186 is an input image 200. In the contraction CNN 182, the feature map on each layer are down-sampled into another feature map, which is used as the input 202, 204, 206 to the respective next layer below. The down-sampling process 208 may be, for example, a max-pooling operation or a stride operation.

In expansion CNN 184, the feature map 208, 210, 212 on each layer 192, 198, 196 is up-sampled into another feature map 214, 216, 218, respectively, which is used in the next layer 198, 196, 194. The up-sampling process may be, for example, an up-sample convolution operation. transposed convolution or bilinear upsampling.

In order to capture localisation patterns, high-resolution feature maps 220, 222, 224 in the respectively corresponding layers 190, 188, 186 in the contraction CNN 182 are copied and concatenated (shown as the dash line arrows in the figure) to the up-sampled feature maps 214, 216, 218, respectively, and the resulting high-resolution feature map/feature map pairs 220/214, 222/216, 224/218 are used as the inputs of the respective layers 198, 196, 194. On the last layer 194 of the expansion CNN 184, the feature map 226 resulting from the convolution process is converted into, and output as, a final segmentation and identification map 228; this conversion is shown as the solid line arrow in the figure. The conversion could be implemented as, for example, a convolution operation or sampling.

The deep learning segmentation and identification model 180 of FIG. 6 thus combines the location information from the contraction path with the contextual information in the expansion path to finally obtain general information combining localisation and context.

Figure 7A:
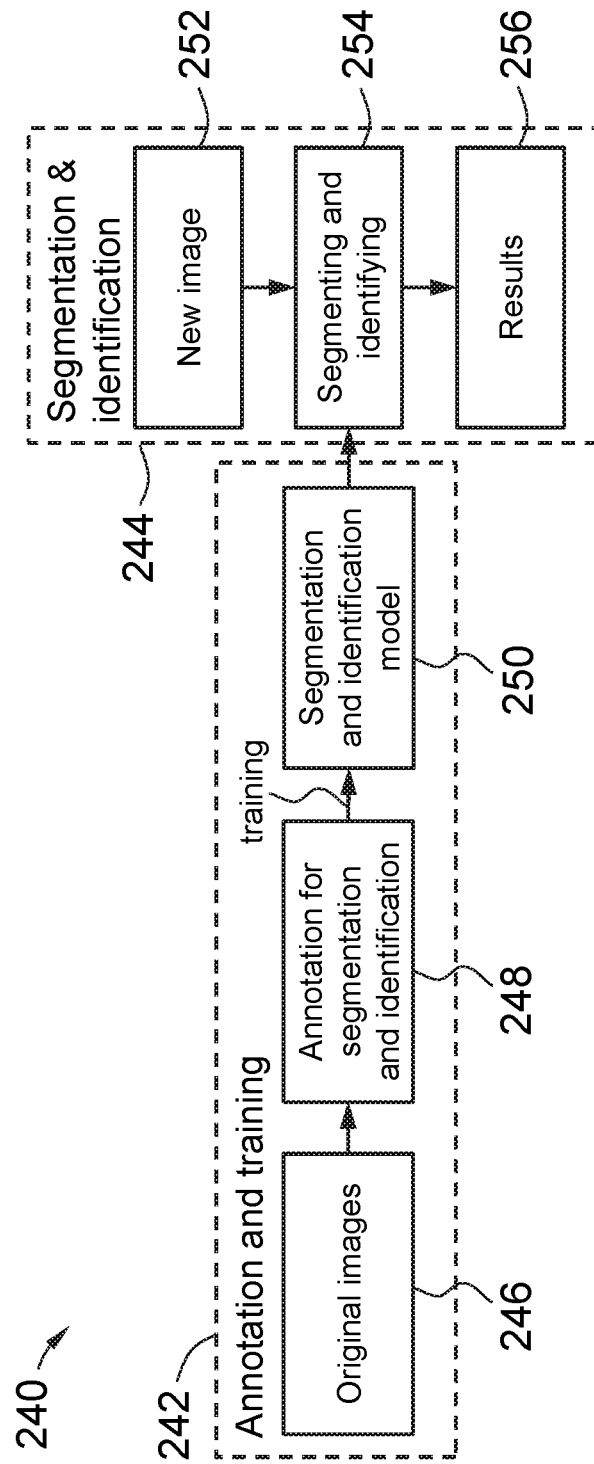
FIGS. 7A to 7C are schematic views of three exemplary implementations of segmentation and identification in the system of FIGS. 1A and 1B.
Figure 7B:
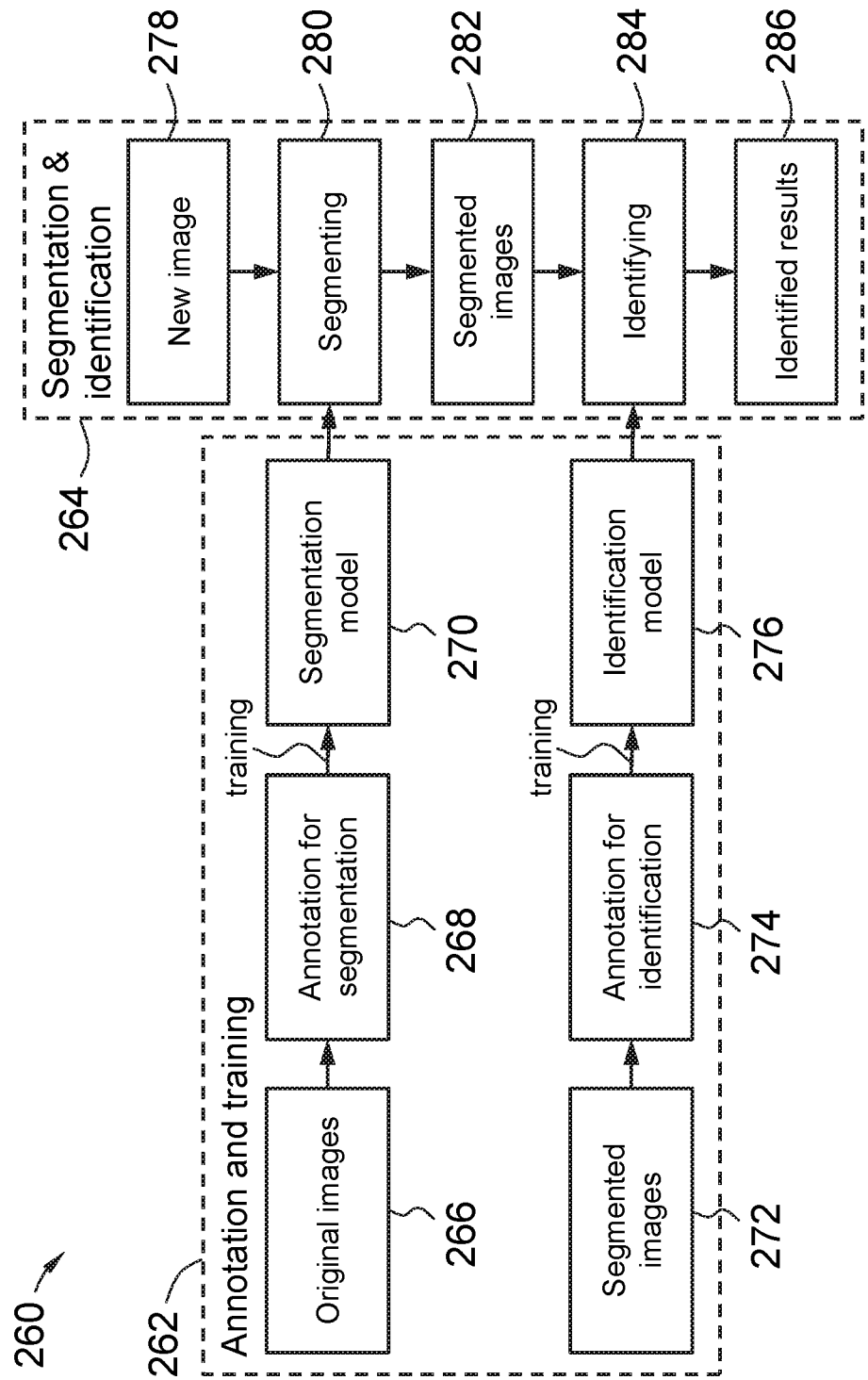
Figure 7C:
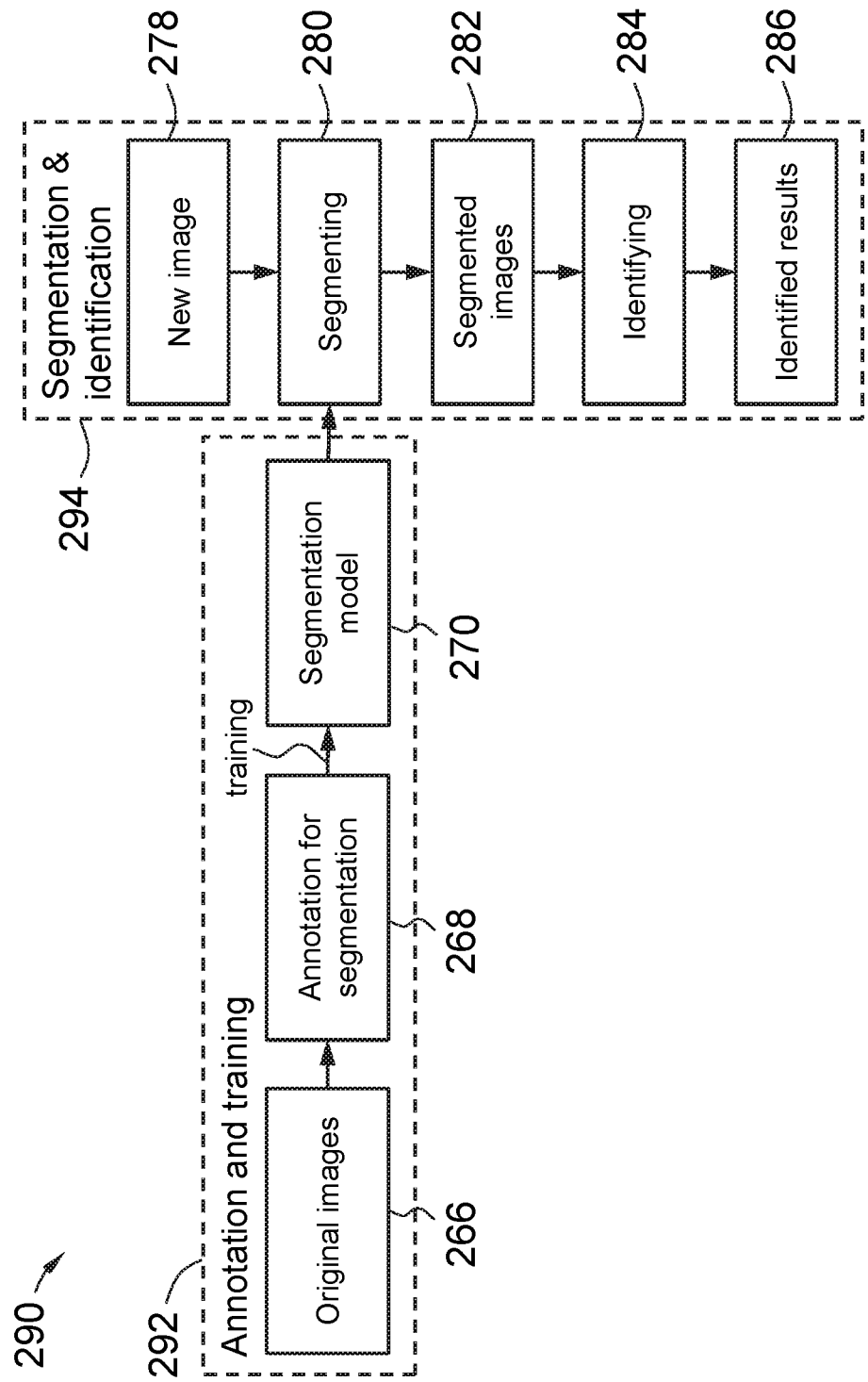

Exemplary implementations of segmentation and identification in system 10 according to embodiments of the present invention are shown in FIGS. 7A to 7C. Referring to FIG. 7A, a first segmentation and identification implementation 240 may be characterized as a 'one step' embodiment. First segmentation and identification implementation 240 includes an annotation and training phase 242 and a segmentation and identification phase 244. In the former, original images 246 are subjected to annotation 248 for segmentation and identification then, after the training has been conducted, the segmentation and identification model 250 is generated. In segmentation and identification phase 244, a new image 252 is subjected to segmenting and identifying 254 according to segmentation and identification model 250, after which segmentation and identification results 256 are outputted.

Hence, in the embodiment of FIG. 7A, model 250 is trained to perform segmentation and identification at the same time. For example, to train a model of segmenting and identifying radius and fibula bones on the wrist CT scan, the training images are annotated such that voxels of radius and fibula are labelled as different values. When the model is ready, any new wrist CT scan images 252 are processed by segmentation and identification model 250 and the result 256 will be in the form of a map of the radius bone and fibula bone in segmented and identified format.

A second segmentation and identification implementation 260 is shown schematically in FIG. 7B. In implementation 260, segmentation and identification are implemented in two steps. Referring to FIG. 7B, implementation 260 also includes an annotation and training phase 262 and a segmentation and identification phase 264, but annotation and training phase 262 includes the training of the segmentation model and the training of the identification model as separate processes. Thus, original medical images 266 are annotated 268 to train the segmentation model 270. The segmented images 272 are annotated 274 to train the identification model 276. After the two models 270, 276 have been trained, any new image 264 is first segmented 280 by the segmentation model 270, then the resulting segmented image(s) 282 subjected to identification 284 by the identification model 276, and the identified results 286 are outputted. For example, by in these two steps, all the bones in a wrist CT scan could first be segmented from the surrounding material, and different types of bones differentiated and identified.

A third segmentation and identification implementation 290 is shown schematically in FIG. 7C. In this implementation, the segmentation model achieves very accurate results, and identification can be performed using a heuristic-based algorithm rather than a machine learning based model. Referring to FIG. 7C, implementation 290 includes an annotation and training phase 292 and a segmentation and identification phase 294. Original images 266 are, in the annotation and training phase 292, annotated 268 for segmentation and used to train a segmentation model 270. In segmentation and identification phase 264, a new image 278 is segmented 280 using segmentation model 270 to produce a segmented image 282, then identification 284 is performed using a heuristic-based algorithm and the identified results 286 are outputted. For example, a wrist CT scan, once accurately segmented 280 using segmentation model 270, may allow a different bone to be identified by, for example, volume calculation and differentiation.

For example, in the wrist HRpQCT scan, after the segmentation of the bones, radius bone can be readily differentiated and identified from the ulna bone by calculating and comparing the bone volume—as the radius bone is bigger than the ulna bone of the same subject.

Figure 8A:
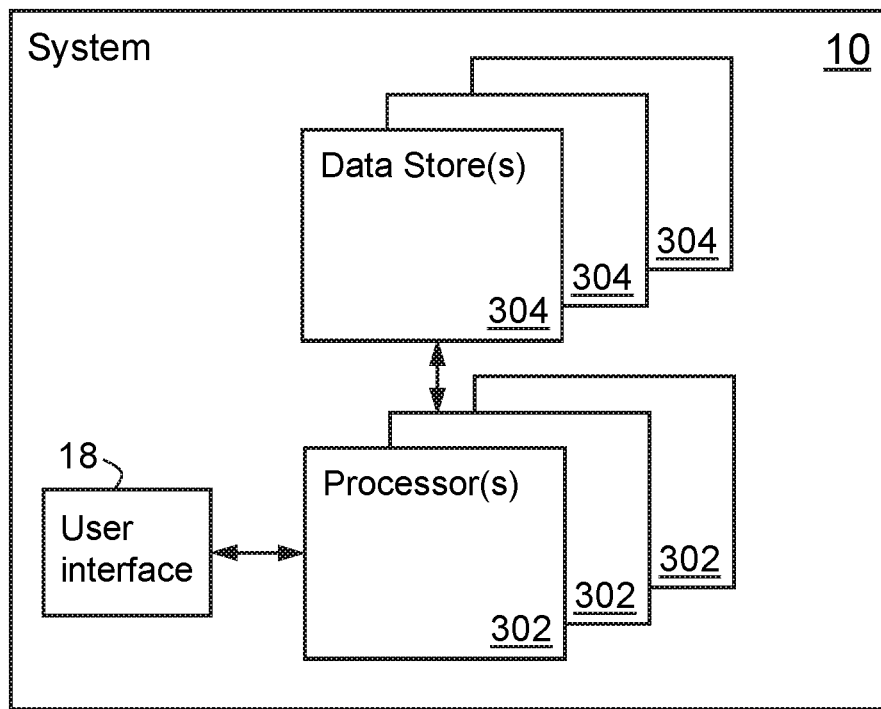
FIGS. 8A to 8C are schematic views of three exemplary deployments of the system of FIGS. 1A and 1B.
Figure 8B:
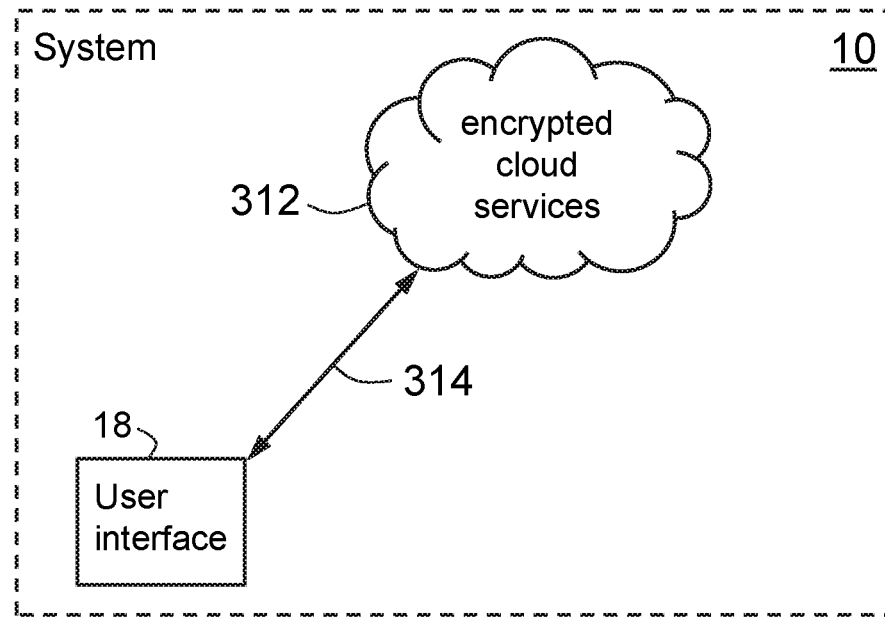
Figure 8C:
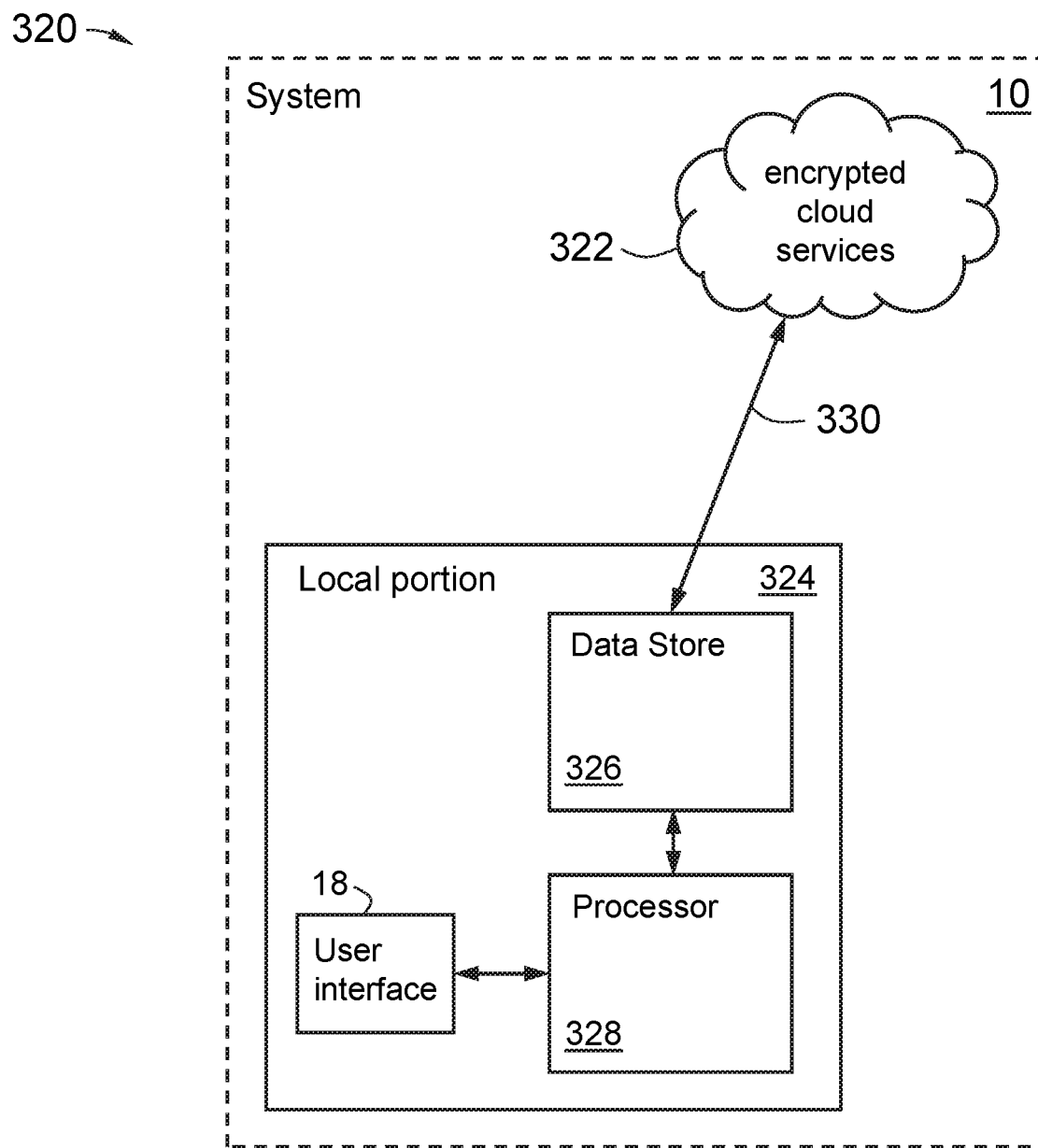

Three exemplary deployments of system 10 are shown schematically in FIGS. 8A to 8C: on-premise deployment, cloud deployment, and hybrid deployment respectively. As shown in FIG. 8A, in a first deployment 300, system 10 is deployed locally (though possibly in a distributed fashion). All data processing (such as the training of models, and the segmenting and identifying of images) is conducted by one or more processors 302 of system 10. The data are encrypted and stored in one or more data stores 304. Users interact with system 10, such as in annotating images and inspecting results, through user interface 18.

As shown in FIG. 8B, in a second deployment 310, system 10—apart from user interface 18—is deployed in the encrypted cloud 312. User interface 18 is situated locally. Communication 314 between user interface 18 and encrypted cloud 312 is encrypted.

As shown in FIG. 8C, in a third deployment 320, system 10 is partly deployed in the encrypted cloud services 322 while a local portion 324—comprising a data store 326, some processing capacity (such as a processor) 328 and user interface 18—is deployed locally. In such a deployment, the bulk of system 10 (apart from user interface 18) is typically deployed in cloud services 322, although data store 326 and processing capacity 328 are sufficient to support user interface 18 and communication 330 between local portion 324 and cloud services 322. Communication 330 between local portion 324 and cloud services 322 is encrypted.

It will be understood to persons skilled in the art of the invention that many modifications may be made without departing from the scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An image segmentation system, comprising:
   a training subsystem configured to train a segmentation machine learning model using annotated training data comprising images associated with respective segmentation annotations, so as to generate a trained segmentation machine learning model;
   a model evaluator; and
   a segmentation subsystem configured to perform segmentation of a structure or material in an image using the trained segmentation machine learning model;
   wherein the model evaluator is configured to evaluate the segmentation machine learning model by
   (i) controlling the segmentation subsystem to segment at least one evaluation image associated with an existing segmentation annotation using the segmentation machine learning model and thereby generate a segmentation of the annotated evaluation image, and
   (ii) forming a comparison of the segmentation of the annotated evaluation image and the existing segmentation annotation; and
   wherein the system is configured to deploy or release the trained segmentation machine learning model for use if the comparison indicates that the segmentation machine learning model is satisfactory.

2. A system as claimed in claim 1, wherein the system is configured to deploy or release the model for use if the segmentation of the annotated evaluation image and the existing annotation agree to within a predefined threshold.

3. A system as claimed in claim 1, wherein the system is configured to continue training the model if the segmentation of the annotated evaluation image and the existing annotation do not agree to within a predefined threshold.

4. A system as claimed in claim 1, wherein the training subsystem is configured to receive
  (i) an image and an annotation for the image, and
  (ii) a score associated with the annotation, the score being indicative of a degree of success or failure of the segmentation machine learning model in segmenting the image, wherein a higher score is indicative of failure and a lower weighting is indicative of success; and
  retrain or refine the segmentation machine learning model using the image and the annotation, including weighting the annotation of the image according to the score.

5. A system as claimed in claim 1, wherein the training subsystem generates the segmentation machine learning model by refining or modifying an existing segmentation machine learning model.

6. A system as claimed in claim 1, including an annotation subsystem configured to form at least one of the annotated training images from an unannotated or partially annotated image by generating one or more candidate image annotations for the unannotated or partially annotated image, receiving inputs identifying one or more portions of the one or more of the candidate image annotations, and forming the annotated training image from at least the one or more portions.

7. A system as claimed in claim 1, further comprising an identification subsystem, wherein the annotated training data further comprise identification annotations, and
  a) the segmentation machine learning model is a segmentation and identification machine learning model; or
  b) the training subsystem is further configured to train an identification machine learning model using (i) the annotated training data once the respective images have been segmented by the segmentation machine learning model and (ii) the identification annotations.

8. A system as claimed in claim 1, wherein the training subsystem includes a model trainer configured to employ machine learning to train the segmentation machine learning model to determine a class of each pixel/voxel on the image.

9. An image annotation and segmentation system, comprising:
  a) an input for receiving at least one unannotated or partially annotated image; and
  b) an annotator configured to form a respective annotated training image from the at least one unannotated or partially annotated image by
    generating one or more candidate image annotations for the unannotated or partially annotated image,
    receiving inputs identifying one or more portions of the one or more of the candidate image annotations, and forming the annotated training image from at least the one or more portions; and
  c) an image segmentation system as claimed in claim 1; wherein the training subsystem is configured to train the segmentation machine learning model using the at least one annotated training image.

10. A computer-implemented image segmentation method, comprising:
  training a segmentation machine learning model using annotated training data comprising respective images and segmentation annotations, so as to generate a trained segmentation machine learning model;
  evaluating the segmentation machine learning model by
  (i) segmenting at least one evaluation image associated with an existing annotation using the segmentation machine learning model and thereby generating a segmentation of the annotated evaluation image, and
  (ii) forming a comparison of the segmentation of the annotated evaluation image and the existing annotation; and
  deploying or releasing the trained segmentation machine learning model for use when the comparison indicates that the segmentation machine learning model is satisfactory.

11. A method as claimed in claim 10, including
  (a) deploying or releasing the model for use if the segmentation of the annotated evaluation image and the existing annotation agree to within a predefined threshold; and/or
  (b) continuing to train the model if the segmentation of the annotated evaluation image and the existing annotation do not agree to within a predefined threshold.

12. A method as claimed in claim 10, wherein said training includes receiving
  (i) an annotated image for use in retraining or refining the segmentation machine learning model, and
  (ii) a score associated with the annotated image, the score being indicative of a degree of success or failure of the segmentation machine learning model in segmenting the annotated image, wherein a higher score is indicative of failure and a lower weighting is indicative of success; and
  weighting the annotated image according to the score in the retraining or refining of the segmentation machine learning model.

13. A method as claimed in claim 10, including generating the segmentation machine learning model by refining or modifying an existing segmentation machine learning model.

14. A method as claimed in claim 10, including forming at least one of the annotated training images from an unannotated or partially annotated image by generating one or more candidate image annotations for the unannotated image, receiving inputs identifying one or more portions of the one or more of the candidate image annotations, and forming the annotated training image from at least the one or more portions.

15. A method as claimed in claim 10, wherein
  (a) the annotated training data further comprise identification data, and the method includes training the segmentation machine learning model as a segmentation and identification machine learning model; or
  (b) the annotated training data further comprise identification annotations and the method includes training an identification machine learning model using (i) the annotated training data once the respective images have been segmented by the segmentation machine learning model and (ii) the identification annotations.

16. A method as claimed in claim 10, including employing machine learning to train the segmentation machine learning model to determine a class of each pixel/voxel on the image.

17. An image annotation and segmentation method, comprising:
  a) receiving or accessing at least one unannotated or partially annotated image; and
  b) forming a respective annotated training image from the unannotated or partially annotated image by generating one or more candidate image annotations for the unannotated image, receiving inputs identifying one or more portions of the one or more of the candidate image annotations, and forming the annotated training image from at least the one or more portions; and c) performing a segmentation method as claimed in claim 10, including training the segmentation machine learning model using the at least one annotated training image.

18. Computer program code configured, when executed by one or more processors, to implement the method of claim 17.

19. Computer program code configured, when executed by one or more processors, to implement the method of claim 10.

20. A computer readable medium, comprising the computer program code of claim 19.

* * * * *

UNITED STATES PATENT AND TRADEMARK OFFICE
CERTIFICATE OF CORRECTION

PATENT NO. : 10,997,466 B2  
APPLICATION NO. : 16/448252  
DATED : May 4, 2021  
INVENTOR(S) : Yu Peng Page 1 of 1

It is certified that error appears in the above-identified patent and that said Letters Patent is hereby corrected as shown below:

On the Title Page

(73) Assignee: STRAXCIRO PTY. LTD., Melbourne (AU)  
Should read:  
(73) Assignee: STRAXCORP PTY. LTD., Melbourne (AU)

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*